(12) United States Patent
Wang et al.

(10) Patent No.: US 11,205,456 B2
(45) Date of Patent: Dec. 21, 2021

(54) METHODS AND APPARATUS FOR USING EDIT OPERATIONS TO PERFORM TEMPORAL TRACK DERIVATIONS

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/737,349

(22) Filed: Jan. 8, 2020

(65) Prior Publication Data

US 2020/0219536 A1    Jul. 9, 2020

Related U.S. Application Data

(60) Provisional application No. 62/790,147, filed on Jan. 9, 2019.

(51) Int. Cl.
*G11B 20/12* (2006.01)
*G11B 20/10* (2006.01)

(52) U.S. Cl.
CPC .... *G11B 20/1217* (2013.01); *G11B 20/10527* (2013.01); *G11B 2020/10611* (2013.01)

(58) Field of Classification Search
CPC .......... G11B 20/1217; G11B 20/10527; G11B 2020/10611; G11B 27/034;

(Continued)

(56) References Cited

U.S. PATENT DOCUMENTS 8,488,943 B1    7/2013  Sharifi
2010/0153395 A1*  6/2010  Hannuksela ..... H04N 21/85406
                                                         707/737

(Continued)

FOREIGN PATENT DOCUMENTS

TW        201836358 A     10/2018

OTHER PUBLICATIONS

[No Author Listed], Information technology—Coding of audio-visual objects—Part 12: ISO base media file format. ISO/IEC 14496-12, Fifth Edition. Feb. 5, 2015: 256 pages.

(Continued)

*Primary Examiner* — Thai Q Tran
*Assistant Examiner* — Nienru Yang
(74) *Attorney, Agent, or Firm* — Wolf, Greenfield & Sacks, P.C.

(57) ABSTRACT

The techniques described herein relate to methods, apparatus, and computer readable media configured to access multimedia data comprising a hierarchical track structure with a first track of a first sequence of temporally-related media units at a first level, and a second track at a second level comprising metadata specifying a temporal track derivation operation. The metadata includes a set of one or more operations to perform on the first track, each operation including a unit duration of the first sequence and a start unit in the first sequence. The temporal track derivation operation is performed on a set of media units comprising at least the first sequence, and includes applying the set of one or more operations to temporally modify the first sequence to generate second media data for the second track that includes a second sequence of temporally-related media units from the set of media units.

21 Claims, 11 Drawing Sheets

(58) Field of Classification Search
CPC .......... G11B 2220/2562; G11B 27/105; H04N 5/85; H04N 9/8042
USPC ........................................................ 386/353
See application file for complete search history.

(56) References Cited

U.S. PATENT DOCUMENTS

| | | | |
|---|---|---|---|
| 2013/0170561 A1* | 7/2013 | Hannuksela | H04N 19/159 375/240.25 |
| 2018/0184098 A1 | 6/2018 | Denoual et al. | |
| 2018/0199044 A1 | 7/2018 | Wang et al. | |
| 2019/0075148 A1 | 3/2019 | Nielsen et al. | |
| 2019/0173935 A1 | 6/2019 | Lohmar et al. | |
| 2020/0099997 A1 | 3/2020 | Denoual et al. | |
| 2020/0111510 A1 | 4/2020 | Wang et al. | |

OTHER PUBLICATIONS

Singer et al., Technologies under Consideration for ISOBMFF. International Organisation for Standardisation, Coding of Moving Pictures and Audio, ISO/IEC JTC1/SC29/WG11, MPEG2018/N17575. Apr. 2018: 53 pages.

Wang et al., Media Processing related Track Derivations in ISOBMFF. International Organisation for Standardisation, Coding of Moving Pictures and Audio, ISO/IEC JTC1/SC29/WG11, MPEG2016/M44800. Oct. 2018: 16 pages.

Wang et al., Temporal Track Derivations in ISOBMFF. International Organisation for Standardisation, Coding of Moving Pictures and Audio, ISO/IEC JTC1/SC29/WG11, MPEG2016/M44801. Oct. 2018: 5 pages.

[No Author Listed], Information technology—Coded representation of immersive media (MPEG-I)—Part 2: Omnidirectional media format. ISO/IEC JTC1/SC29/WG11. Dec. 11, 2017:178 pages.

Park et al., Use cases and requirements for NBMP (v4). International Organisation for Standardisation, Coding of Moving Pictures and Audio, ISO/IEC JTC1/SC29/WG11 MPEG2018/N17502. Apr. 2018:31 pages.

Wang et al., Deriving Composite Tracks in ISOBMFF using Track Grouping Mechanisms. International Organisation for Standardisation, Coding of Moving Pictures and Audio, ISO/IEC JTC1/SC29/WG11 MPEG2016/M40384. Apr. 2017:12 pages.

Wang et al., Deriving Composite Tracks in ISOBMFF. International Organisation for Standardisation, Coding of Moving Pictures and Audio, ISO/IEC JTC1/SC29/WG11 MPEG2016/M39971. Jan. 2017:9 pages.

Wang et al., Deriving VR Projection and Mapping related Tracks in ISOBMFF. International Organisation for Standardisation, Coding of Moving Pictures and Audio, ISO/IEC JTC1/SC29/WG11 MPEG2016/M40385. Apr. 2017:8 pages.

Wang et al., Deriving VR ROI and Viewport related Tracks in ISOBMFF. International Organisation for Standardisation, Coding of Moving Pictures and Audio, ISO/IEC JTC1/SC29/WG11 MPEG2016/M40412. Apr. 2017:11 pages.

U.S. Appl. No. 16/589,906, filed Oct. 1, 2019, Wang et al.

* cited by examiner

```
aligned(8) class EditListBox extends FullBox('elst', version, 0) {
    unsigned int(32)   entry_count;
    for (i=1; i <= entry_count; i++) {
        if (version==1) {
            unsigned int(64) segment_duration;
            int(64) media_time;
        } else { // version==0
            unsigned int(32) segment_duration;
            int(32)          media_time;
        }
        int(16) media_rate_integer;
        int(16) media_rate_fraction = 0;
    }
}
```

FIG. 9

```
aligned(8) class EditLists extends TransformProperty('edls') {
    for (i=0; i<num_inputs; i++)
        EditBox();
}
```

FIG. 11

METHODS AND APPARATUS FOR USING EDIT OPERATIONS TO PERFORM TEMPORAL TRACK DERIVATIONS

RELATED APPLICATIONS

This Application claims priority under 35 U.S.C. § 119(e) to U.S. Provisional Application Ser. No. 62/790,147, filed Jan. 9, 2019 and entitled "METHODS OF TEMPORAL TRACK DERIVATIONS IN ISOBMFF USING THE EDIT LIST MECHANISM," which is hereby incorporated by reference in its entirety.

TECHNICAL FIELD

The techniques described herein relate generally to temporal track derivations. In particular, the techniques relate to using edit operations to perform temporal track derivations.

BACKGROUND OF INVENTION

Various types of 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangular projection can be used to put the spherical map into a two-dimensional image. This can be then further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

At the client side, when the client processes the content, a video decoder decodes the encoded and compressed video and performs a reverse-projection to put the content back onto the sphere. A user can then view the rendered content, such as using a head-mounted viewing device. The content is often rendered according to a user's viewport, which represents an angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder and/or decoder do not know what the user will actually view, then the whole encoding, delivery and decoding process will process the entire spherical content. This can allow, for example, the user to view the content at any particular viewport and/or area, since all of the spherical content is encoded, delivered and decoded.

However, processing all of the spherical content can be compute intensive and can consume significant bandwidth. For example, for online streaming applications, processing all of the spherical content can place a larger burden on network bandwidth than necessarily needed. Therefore, it can be difficult to preserve a user's experience when bandwidth resources and/or compute resources are limited. Some techniques only process the content being viewed by the user. For example, if the user is viewing a top area (e.g., the north pole), then there is no need to deliver the bottom part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for supporting temporal track derivations.

Some embodiments relate to a method implemented by at least one processor in communication with a memory, wherein the memory stores computer-readable instructions that, when executed by the at least one processor, cause the at least one processor to perform accessing multimedia data comprising a hierarchical track structure comprising at least a first track at a first level of the hierarchical track structure comprising first media data, wherein the first media data comprises a first sequence of temporally-related media units, and a second track at a second level in the hierarchical track structure that is different than the first level of the first track, the second track comprising metadata specifying a temporal track derivation operation. The metadata comprises a set of one or more operations to perform on the first track, each operation of the set of one or more operations comprising a unit duration of the first sequence of temporally-related media units, and a start unit in the first sequence of temporally-related media units. The instructions cause the at least one processor to perform the temporal track derivation operation on a set of media units comprising at least the first sequence of temporally-related media units, comprising applying the set of one or more operations to temporally modify the first sequence of temporally-related media units to generate second media data for the second track, wherein the second media data comprises a second sequence of temporally-related media units from the set of media units.

In some examples, the set of one or more operations remove a set of one or more media units of the first sequence of temporally-related media units, and said performing the temporal track derivation operation on the set of media units comprises applying the set of one or more operations to remove the set of one or more media units from the first sequence of temporally-related media units to generate the second sequence of temporally-related media units.

In some examples, the set of one or more operations comprise a first operation specifying a trim operation comprising a first unit duration of zero and a first unit specifying a last media unit of the set of one or more media units of the first sequence of temporally-related media units, and said removing the set of one or more media units from the first sequence of temporally-related media units comprises applying the first operation to remove the set of one or more media units from a beginning portion of the first sequence of temporally-related media units through the unit.

In some examples, the set of one or more operations comprise a first operation specifying a trim operation including a first unit duration specifying a last media unit of the first sequence of temporally-related media units and a first unit of zero, and said removing the set of one or more media units from the first sequence of temporally-related media units comprises applying the first operation to remove the set of one or more media units from an end portion of the first sequence of temporally-related media units starting from the last media unit.

In some examples, the set of one or more operations comprise a first operation specifying a first portion of a cut operation, comprising a first unit duration specifying a last media unit of the first sequence of temporally-related media units before the cut operation, and a first unit of zero, and a second operation specifying a second portion of the cut operation, comprising a second unit duration of zero and a second unit specifying a starting media unit of the first sequence of temporally-related media units after the cut operation, which is determined based on the last media unit plus the set of one or more media units. Said removing the set of one or more media units from the first sequence of temporally-related media units comprises applying the first and second operations to remove the set of one or more media units from a middle portion of the first sequence of temporally-related media units starting after the last media unit and ending before the starting media unit.

In some examples, the set of one or more operations include a first operation specifying a first portion of a cut operation, including a first unit duration specifying a last media unit of the first sequence of temporally-related media units before the cut operation and a first unit of zero, and a second operation specifying a second portion of the cut operation, including a second unit duration of zero and a second unit specifying a starting media unit of the first sequence of temporally-related media units after the cut operation, which is determined based on the last media unit plus the set of one or more media units, and said performing the temporal track derivation operation on the set of media units comprises applying the first and second operations to generate the second sequence of temporally-related media units to include the set of one or more media units.

In some examples, said performing the temporal track derivation operation on the set of media units comprises generating third media data for a third track at the second level in the hierarchical track structure that is different than the first level of the first track, the third media data comprising a third sequence of temporally-related media units, wherein the second sequence of temporally-related media units comprises a first set of all media units of the first sequence of temporally-related media units before the cut operation and the third sequence of temporally-related media units comprises a second set of all media units after a second cut operation.

In some examples, the set of one or more operations comprise a third operation specifying a first portion of the second cut operation, comprising a third unit duration specifying a second last media unit of the first sequence of temporally-related media units before the cut operation and a third unit of zero, and a fourth operation specifying a second portion of the second cut operation, comprising a fourth unit duration of zero and a fourth unit specifying a second starting media unit of the first sequence of temporally-related media units after the second cut operation, which is determined based on the second last media unit plus a second set of one or more media units. Generating the third media data for the third track comprises applying the third and fourth operations to generate the third sequence of temporally-related media units to comprise the second set of one or more media units.

In some examples, the hierarchical track structure further comprises a third track at a third level below the second level comprising third media data, wherein the third media data comprises a third sequence of temporally-related media units, the metadata comprises a second set of one or more operations to perform on the third track, each operation comprising a second unit duration of the third sequence of temporally-related media units and a second unit in the third sequence of temporally-related media units, and the set of media units further comprises the third sequence of temporally-related media units.

In some examples, the set of one or more operations and the second set of one or more operations comprise empty operation sets, and performing the temporal track derivation operation on the set of media units comprises joining the first sequence of temporally-related media units and the third sequence of temporally-related media units to generate the second sequence of temporally-related media units.

In some examples, the set of one or more operations comprise a first operation specifying a first cut operation comprising a first unit duration specifying a first media unit representative of an end of a first set of the first sequence of temporally-related media units and a first unit of zero, the second set of one or more operations comprising a second operation specifying a second cut operation comprising a second unit duration specifying a second media unit representative of an end of a second set of the third sequence of temporally-related media units and a second unit of zero, and the metadata further comprises a third set of one or more operations to perform on the first track, the third set of one or more operations comprising a third operation specifying a third cut operation comprising a third unit duration of zero and a third unit specifying a third media unit representative of a beginning of a third set of the first sequence of temporally-related media units. Said performing the temporal track derivation operation on the set of media units can include applying the first operation to cut the first set of the first sequence of temporally-related media units from the first sequence of temporally-related media units, applying the second operation to cut the second set of the third sequence of temporally-related media units from the third sequence of temporally-related media units, applying the third operation to cut the third set of the first sequence of temporally-related media units from the first sequence of temporally-related media units, and joining the first set, the second set, and the third set, so that the second set is between the first set and the second set.

Some embodiments relate to an apparatus comprising a processor in communication with memory, the processor being configured to execute instructions stored in the memory that cause the processor to perform accessing multimedia data comprising a hierarchical track structure comprising at least a first track at a first level of the hierarchical track structure comprising first media data, wherein the first media data comprises a first sequence of temporally-related media units and a second track at a second level in the hierarchical track structure that is different than the first level of the first track, the second track comprising metadata specifying a temporal track derivation operation. The metadata comprises a set of one or more operations to perform on the first track, each operation of the set of one or more operations comprising a unit duration of the first sequence of temporally-related media units and a start unit in the first sequence of temporally-related media units. The instructions cause the processor to perform the temporal track derivation operation on a set of media units comprising at least the first sequence of temporally-related media units, comprising applying the set of one or more operations to temporally modify the first sequence of temporally-related media units to generate second media data for the second track, wherein the second media data comprises a second sequence of temporally-related media units from the set of media units.

In some examples, the set of one or more operations remove a set of one or more media units of the first sequence of temporally-related media units, and said performing the temporal track derivation operation on the set of media units comprises applying the set of one or more operations to remove the set of one or more media units from the first sequence of temporally-related media units to generate the second sequence of temporally-related media units.

In some examples, the set of one or more operations comprise a first operation specifying a trim operation comprising a first unit duration of zero and a first unit specifying a last media unit of the set of one or more media units of the first sequence of temporally-related media units, and said removing the set of one or more media units from the first sequence of temporally-related media units comprises applying the first operation to remove the set of one or more media units from a beginning portion of the first sequence of temporally-related media units through the unit.

In some examples, the set of one or more operations comprise a first operation specifying a trim operation comprising a first unit duration specifying a last media unit of the first sequence of temporally-related media units and a first unit of zero, and said removing the set of one or more media units from the first sequence of temporally-related media units comprises applying the first operation to remove the set of one or more media units from an end portion of the first sequence of temporally-related media units starting from the last media unit.

In some examples, the set of one or more operations comprise a first operation specifying a first portion of a cut operation, comprising a first unit duration specifying a last media unit of the first sequence of temporally-related media units before the cut operation and a first unit of zero, and a second operation specifying a second portion of the cut operation, comprising a second unit duration of zero and a second unit specifying a starting media unit of the first sequence of temporally-related media units after the cut operation, which is determined based on the last media unit plus the set of one or more media units, and said removing the set of one or more media units from the first sequence of temporally-related media units comprises applying the first and second operations to remove the set of one or more media units from a middle portion of the first sequence of temporally-related media units starting after the last media unit and ending before the starting media unit.

In some examples, the set of one or more operations comprise a first operation specifying a first portion of a cut operation, comprising a first unit duration specifying a last media unit of the first sequence of temporally-related media units before the cut operation and a first unit of zero, and a second operation specifying a second portion of the cut operation, comprising a second unit duration of zero and a second unit specifying a starting media unit of the first sequence of temporally-related media units after the cut operation, which is determined based on the last media unit plus the set of one or more media units, and said performing the temporal track derivation operation on the set of media units comprises applying the first and second operations to generate the second sequence of temporally-related media units to include the set of one or more media units.

In some examples, said performing the temporal track derivation operation on the set of media units comprises generating third media data for a third track at the second level in the hierarchical track structure that is different than the first level of the first track, the third media data comprising a third sequence of temporally-related media units, wherein the second sequence of temporally-related media units comprises a first set of all media units of the first sequence of temporally-related media units before the cut operation and the third sequence of temporally-related media units comprises a second set of all media units after a second cut operation.

In some examples, the set of one or more operations comprise a third operation specifying a first portion of the second cut operation, comprising a third unit duration specifying a second last media unit of the first sequence of temporally-related media units before the cut operation and a third unit of zero, and a fourth operation specifying a second portion of the second cut operation, comprising a fourth unit duration of zero and a fourth unit specifying a second starting media unit of the first sequence of temporally-related media units after the second cut operation, which is determined based on the second last media unit plus a second set of one or more media units, and generating the third media data for the third track comprises applying the third and fourth operations to generate the third sequence of temporally-related media units to comprise the second set of one or more media units.

In some examples, the hierarchical track structure further comprises a third track at a third level below the second level comprising third media data, wherein the third media data comprises a third sequence of temporally-related media units, the metadata comprises a second set of one or more operations to perform on the third track, each operation comprising a second unit duration of the third sequence of temporally-related media units and a second unit in the third sequence of temporally-related media units, and the set of media units further comprises the third sequence of temporally-related media units.

Some embodiments relate to at least one computer readable storage medium storing processor-executable instructions that, when executed by at least one processor, cause the at least one processor to perform accessing multimedia data comprising a hierarchical track structure comprising at least a first track at a first level of the hierarchical track structure comprising first media data, wherein the first media data comprises a first sequence of temporally-related media units, and a second track at a second level in the hierarchical track structure that is different than the first level of the first track, the second track comprising metadata specifying a temporal track derivation operation. The metadata comprises a set of one or more operations to perform on the first track, each operation of the set of one or more operations comprising a unit duration of the first sequence of temporally-related media units, and a start unit in the first sequence of temporally-related media units. The instructions cause the at least one processor to perform the temporal track derivation operation on a set of media units comprising at least the first sequence of temporally-related media units, comprising applying the set of one or more operations to temporally modify the first sequence of temporally-related media units to generate second media data for the second track, wherein the second media data comprises a second sequence of temporally-related media units from the set of media units.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 9 shows an exemplary syntax for an edit list box, according to some examples.

FIG. 11 shows an exemplary syntax of an Edit Lists transform property for temporally derived tracks using Edit Boxes, according to some embodiments.

DETAILED DESCRIPTION OF INVENTION

Figure 1:
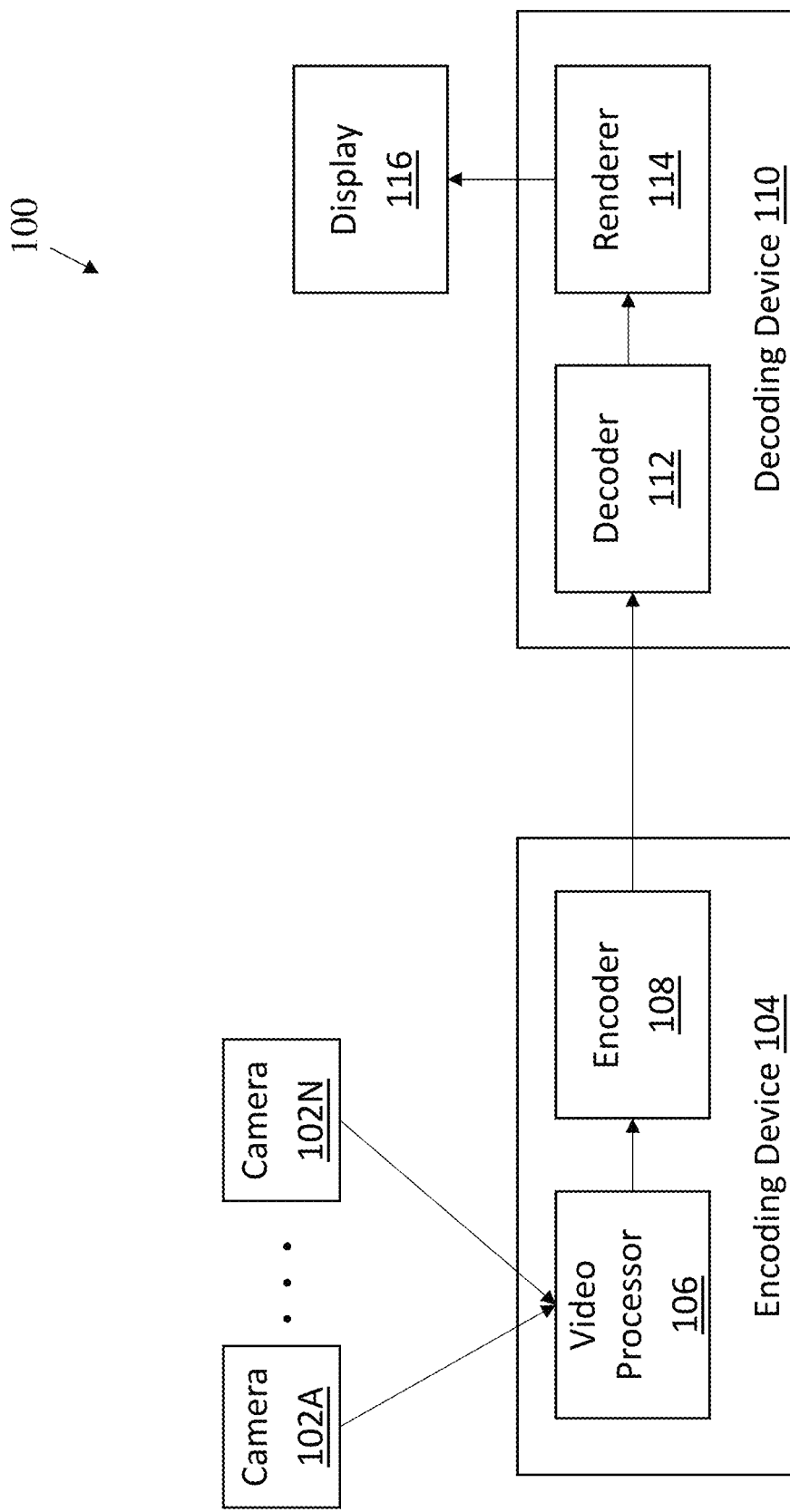
FIG. 1 shows an exemplary video coding configuration, according to some embodiments.

The ISO Base Media File Format (ISOBMFF) provides for track derivations in which generally one or more input tracks are processed to generate an output/derived track. Some track derivations provide for spatial processing of input tracks. For example, spatial track derivations include image manipulation (e.g., such as rotation, dissolve and ROI selection) and spatial composition (e.g., such as overlay composition, track grid composition and sub-picture track composition) of input tracks. The inventors have also developed techniques for temporal processing, such as processing of temporal samples. The techniques can provide for track derivations in the temporal domain that can be used to process temporal sequences of contiguous samples, such as samples in the forms of chucks, fragments, segments, sections, and/or the like, which come from the input tracks of the track derivation operation. Examples of such temporal processing include adding and/or removing multimedia content, modifying the speed of the multimedia content, modifying the timescale of the multimedia content, and/or the like.

ISOBMFF includes techniques, such as edit lists, which can be used to perform operations such as moving a portion of the timeline of the track, delaying playback of the track (e.g., by inserting some blank time), and/or specifying how much of a track to play (e.g., just play 30 seconds). However, the inventors have discovered and appreciated that while such techniques can be used to modify the playback of a particular track, such techniques cannot be used to modify the actual samples of the track. For example, if a track includes two hours of multimedia content, while an edit operation can be used to play only thirty seconds of the track, the receiving device still receives and/or processes all two hours of multimedia content. Therefore, such operations can unnecessarily consume processing and/or network resources. As another example, the edit operations are carried in the track itself, and therefore the edit operations can only be specified on a per-track basis. Therefore the edit operations cannot be used to specify operations that involve multiple tracks (e.g., splicing, insertion, etc.).

The inventors have developed temporal track derivation techniques that can leverage edit operations to perform temporal track derivations on one or more input tracks. The techniques can include specifying a set of one or more operations for each input track, and performing the specified operations to derive the content of a derived track. The techniques support multiple input tracks, which can be edited and combined to provide for a variety of multi-track derivation operations (e.g., insertions, splices, and/or the like). By applying the edit operations when generating the derived track, the derived track can be generated to only include desired/necessary multimedia data. For example, if an input track includes two hours of multimedia content, the edit operations can be applied to include only a desired portion of the multimedia content (e.g., just thirty seconds of the multimedia content). Therefore, the derived track only has content necessary for downstream devices (e.g., thirty seconds of content, compared to two hours of multimedia content), which can significantly save on downstream bandwidth and processing. For example, cloud-based platforms can provide for temporal track derivation operations, which can reduce the bandwidth requirements from such cloud services to downstream devices.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a hand-held device, a portion of a head-mounted display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
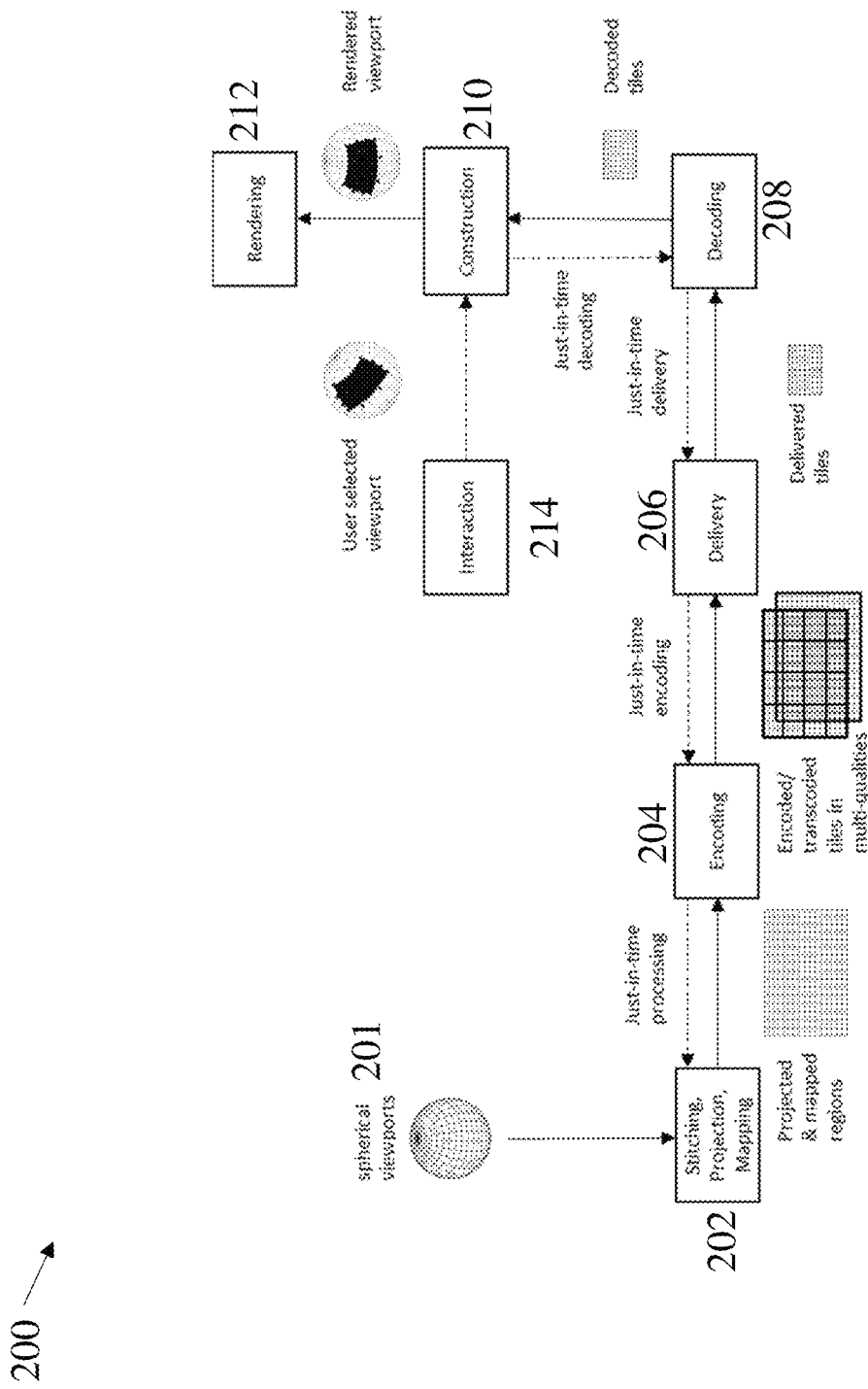
FIG. 2 shows a viewport dependent content flow process for virtual reality (VR) content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

Figure 3:
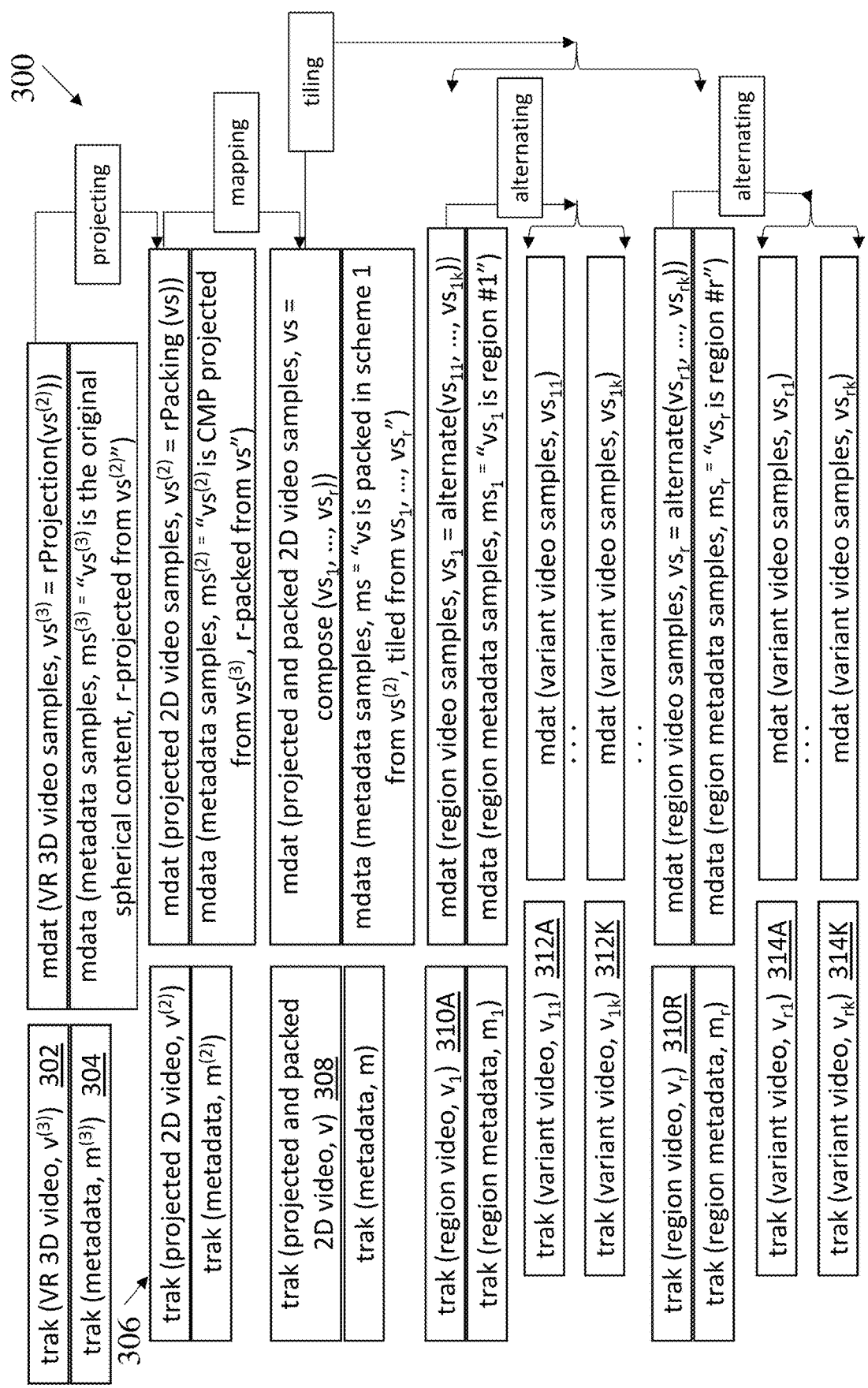
FIG. 3 shows an exemplary track hierarchical structure, according to some embodiments.

A flat file structure for the content could be used, for example, for a video track for a single movie. For VR content, there is more content than is sent and/or displayed by the receiving device. For example, as discussed herein, there can be content for the entire 3D sphere, where the user is only viewing a small portion. In order to encode, store, process, and/or deliver such content more efficiently, the content can be divided into different tracks. FIG. 3 shows an exemplary track hierarchical structure 300, according to some embodiments. The top track 302 is the 3D VR spherical content track, and below the top track 302 is the associated metadata track 304 (each track has associated metadata). The track 306 is the 2D projected track. The track 308 is the 2D big picture track. The region tracks are shown as tracks 310A through 310R, generally referred to as sub-picture tracks 310. Each region track 310 has a set of associated variant tracks. Region track 310A includes variant tracks 312A through 312K. Region track 310R includes variant tracks 314A through 314K. Thus, as shown by the track hierarchy structure 300, a structure can be developed that starts with physical multiple variant region tracks 312, and the track hierarchy can be established for region tracks 310 (sub-picture or tile tracks), projected and packed 2D tracks 308, projected 2D tracks 306, and VR 3D video tracks 302, with appropriate metadata tracks associated them.

In operation, the variant tracks include the actual picture data. The device selects among the alternating variant tracks to pick the one that is representative of the sub-picture region (or sub-picture track) 310. The sub-picture tracks 310 are tiled and composed together into the 2D big picture track 308. Then ultimately the track 308 is reverse-mapped, e.g., to rearrange some of the portions to generate track 306. The track 306 is then reverse-projected back to the 3D track 302, which is the original 3D picture.

The exemplary track hierarchical structure can include aspects described in, for example: m39971, "Deriving Composite Tracks in ISOBMFF", January 2017 (Geneva, CH); m40384, "Deriving Composite Tracks in ISOBMFF using track grouping mechanisms", April 2017 (Hobart, AU); m40385, "Deriving VR Projection and Mapping related Tracks in ISOBMFF;" m40412, "Deriving VR ROI and Viewport related Tracks in ISOBMFF", MPEG 118$^{th}$ meeting, April 2017, which are hereby incorporated by reference herein in their entirety. In FIG. 3, rProjection, rPacking, compose and alternate represent the track derivation TransformProperty items reverse 'proj', reverse 'pack', 'cmpa' and 'cmpl', respectively, for illustrative purposes and are not intended to be limiting. The metadata shown in the metadata tracks are similarly for illustrative purposes and are not intended to be limiting. For example, metadata boxes from OMAF can be used as described in w17235, "Text of ISO/IEC FDIS 23090-2 Omnidirectional Media Format," 120th MPEG Meeting, October 2017 (Macau, China), which is hereby incorporated by reference herein in its entirety.

The number of tracks shown in FIG. 3 is intended to be illustrative and not limiting. For example, in cases where some intermediate derived tracks are not necessarily needed in the hierarchy as shown in FIG. 3, the related derivation steps can be composed into one (e.g., where the reverse packing and reverse projection are composed together to eliminate the existence of the projected track 306).

A derived visual track can be indicated by its containing sample entry of type 'dtrk'. A derived sample contains an ordered list of the operations to be performed on an ordered list of input images or samples. Each of the operations can be specified or indicated by a Transform Property. A derived visual sample is reconstructed by performing the specified operations in sequence. Examples of transform properties in ISOBMFF that can be used to specify a track derivation, including those in the latest ISOBMFF Technologies Under Consideration (TuC) (see, e.g., N17833, "Technologies under Consideration for ISOBMFF", July 2018, Ljubljana, SK, which is hereby incorporated by reference herein in its entirety), include: the 'idtt' (identity) transform property; the 'clap' (clean aperture) transform property; the 'srot' (rotation) transform property; the 'dslv' (dissolve) transform property; the '2dcc' (ROI crop) transform property; the 'tocp' (Track Overlay Composition) transform property; the 'tgcp' (Track Grid Composition) transform property; the 'tgmc' (Track Grid Composition using Matrix values) transform property; the 'tgsc' (Track Grid Sub-Picture Composition) transform property; the 'tmcp' (Transform Matrix Composition) transform property; the 'tgcp' (Track Grouping Composition) transform property; and the 'tmcp' (Track Grouping Composition using Matrix Values) transform property. All of these track derivations are related to spatial processing, including image manipulation and spatial composition of input tracks.

The techniques described herein improve existing track derivation technology by providing for temporal track derivations that process input tracks in the temporal domain. A derived track can include, for example, a temporal aspect, if the derived track includes temporal sequences of contiguous samples. As described herein, the contiguous samples can be in the input tracks, and can be in various forms, such as chucks, fragments, segments, sections, and/or the like. Examples of temporal track derivations include adding and/or removing multimedia content, modifying the speed of the multimedia content, modifying the timescale of the multimedia content, and other temporal operations that can be performed on multimedia content. Various examples of temporal track derivations are provided herein. It should be appreciated that such examples are provided for illustrative purposes and are not intended to be limiting.

The temporal track derivation techniques described herein can be useful in various multimedia processing scenarios, such as those that require adding and/or removing multimedia content. In some embodiments, temporal track derivations can be used for ad processing. For example, a splice derivation can used for deriving tracks representing pre-roll or post-roll insertion, and an insert derivation can be for middle-roll insertion. In some embodiments, temporal track derivations can be used to perform time-based processing using network-based resources. An example of such a media processing framework is proposed by the Network-Based Media Processing (NBMP) activity in N17502, "Use cases and requirements for NBMP (v4)", April 2018, San Diego, US, which is hereby incorporated by reference herein in its entirety. In some examples, the techniques described herein can be used with cloud-based media processing entities (MPEs) to perform the time-based track processing within the cloud, such as to perform ad-based processing in the cloud. Dynamic Adaptive Streaming over HTTP (DASH), for example, supports ad insertion at the manifest level when streaming multi-view multimedia. For example, a streaming manifest can specify different periods for the multimedia content and the ad content (e.g., two periods, one period for a pre-roll ad, and second period with the multimedia content). However, for such DASH configurations, the end-receiver performs the ad-based processing, which can cause undesired complexities, including consuming resources on the client device, requiring that the client device handle media in different formats, and/or the like. The techniques described herein provide for server-side ad insertion, such that tracks can be prepared for a client upstream of the client device, and therefore the client device does not need to be aware of and/or deal with aspects of the manifest.

Figure 4:
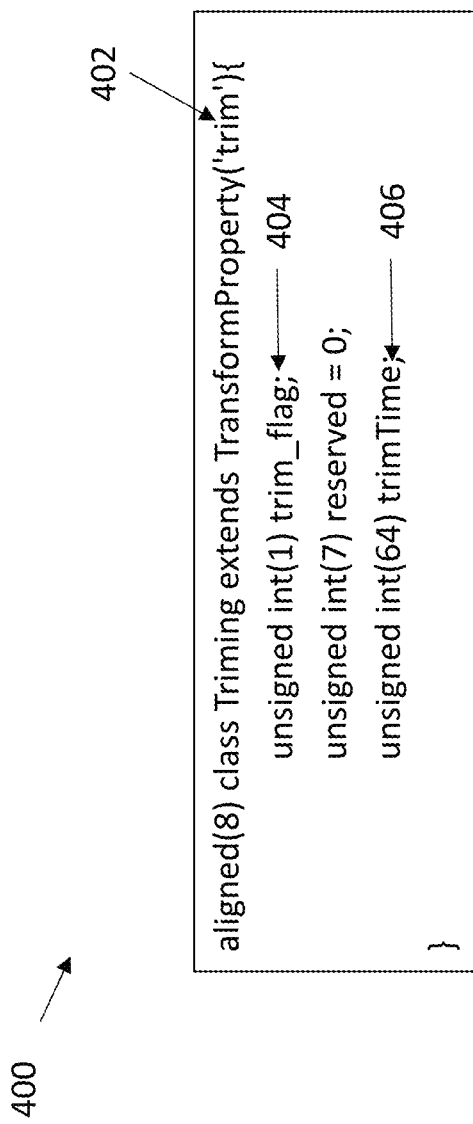
FIG. 4 shows an exemplary syntax for a trim temporal track derivation, according to some embodiments.

Temporal track derivations can be used to modify the multimedia content of input track(s), such as to add to and/or remove multimedia data from a multimedia clip. An example of such a temporal track derivation is a trim operation. A trim operation can be used to remove multimedia content, such as to remove content from the head and/or the tail of a multimedia clip. FIG. 4 shows an exemplary syntax 400 for a trim temporal track derivation, according to some embodiments. The trim track derivation can be an optional derivation that can be specified in any quantity per sample. In the exemplary syntax 400, the 'trim' transform property 402 provides information for the process of trimming an input track to derive a trimmed track. The 'trim' transform property 402, when present, can be used with one input track (e.g., num_inputs is equal to 1). Generally, the transform property can specify an indicator for the type of trim (e.g., head-trim or tail-trim), and a media time at which trimming happens before (e.g., for head-trim) or after (e.g., for tail-trim), inclusively. The trim_flag field 404 can specify an indicator for head-trim or tail-trim, such that a value of trim_flag 404 equal to 0 or 1 indicates that the trim is head-trim or tail-trim, respectively. The trimTime field 406 can be used to specify a media_time (e.g., in the scale of the timescale of the input track) at which any sample in the media of the input track before or after this time is removed (e.g., trimmed) in the derived track, inclusively, depending on whether the trim is head-trim or tail-trim.

As noted, the syntaxes discussed herein, such as the syntax 400 in FIG. 4, are provided for exemplary purposes and are not intended to be limiting. Other naming conventions and/or syntaxes can be used to achieve the techniques described herein. For example, referring to the syntax 400, the trim transform property can be split into two transform properties, one for head-trim and the other for tail-trim, if more desirable than a combined transform property as shown in FIG. 4.

Figure 5:
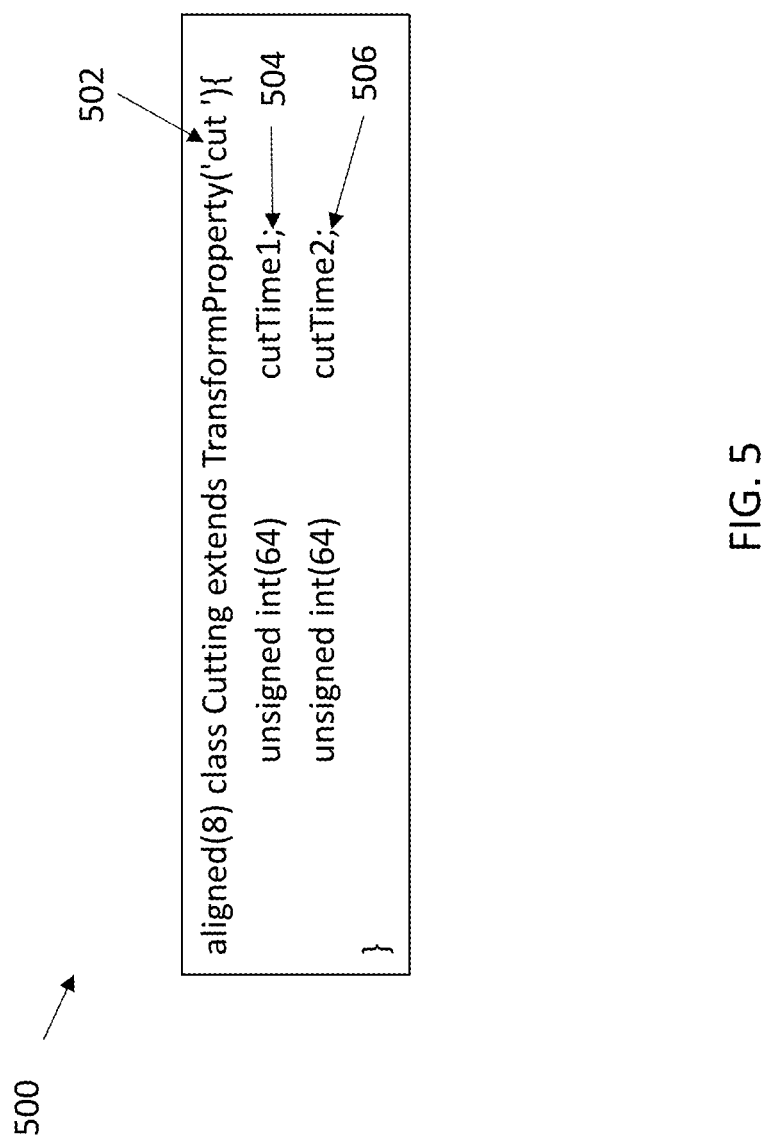
FIG. 5 shows an exemplary syntax for a cut track derivation, according to some embodiments.

Another exemplary temporal track derivation is a cut operation. A cut operation can be used to remove a section of the multimedia content. For example, a cut operation can remove a section of a video clip by essentially cutting the video clip in two places, removing the middle section of the video clip between the two cuts, and joining the leftover video. FIG. 5 shows an exemplary syntax 500 for a cut track derivation, according to some embodiments. The cut track derivation can be an optional derivation that can be specified in any quantity per sample. The exemplary syntax 500 includes a 'cut' transform property 502, which can provide information for the process of cutting an input track to derive a cut track. The 'cut' transform property can use one input track (e.g., num_inputs is equal to 1). Generally, the syntax 500 can specify two media_times between which a cut happens, inclusively. The cutTime1 field 504 and the cutTime2 field 506 can be used to specify two media times (e.g., in the scale of the timescale of the input track), where cutTime1 <=cutTime2. Any sample in the media of the input track in the closed time interval [cutTime1, cutTime2] is removed in the derived track.

A further example of a temporal track derivation is a splice operation. A splice operation can be used to join two video clips. The splice track derivation can be an optional derivation that can be specified in any quantity per sample. In some embodiments, a splice transform property (e.g., 'splc') can be used to provide information for splicing a number of input tracks to derive a spliced track. The derived track is the result of splicing the input tracks one after another in the order of the input tracks, and therefore the derived spliced track can have a duration that is equal to the sum of all durations of the input tracks. The splice transform property can be used for a plurality of input tracks (e.g., num_inputs is greater than one). In some embodiments, the splice transform property can assume that all of the input tracks have a same media type with a same timescale. In some embodiments, the input tracks need not share the same timescale. For example, if the timescales of the input tracks share a common denominator, then the timescale and duration of the derived track can be adjusted accordingly.

Figure 6:
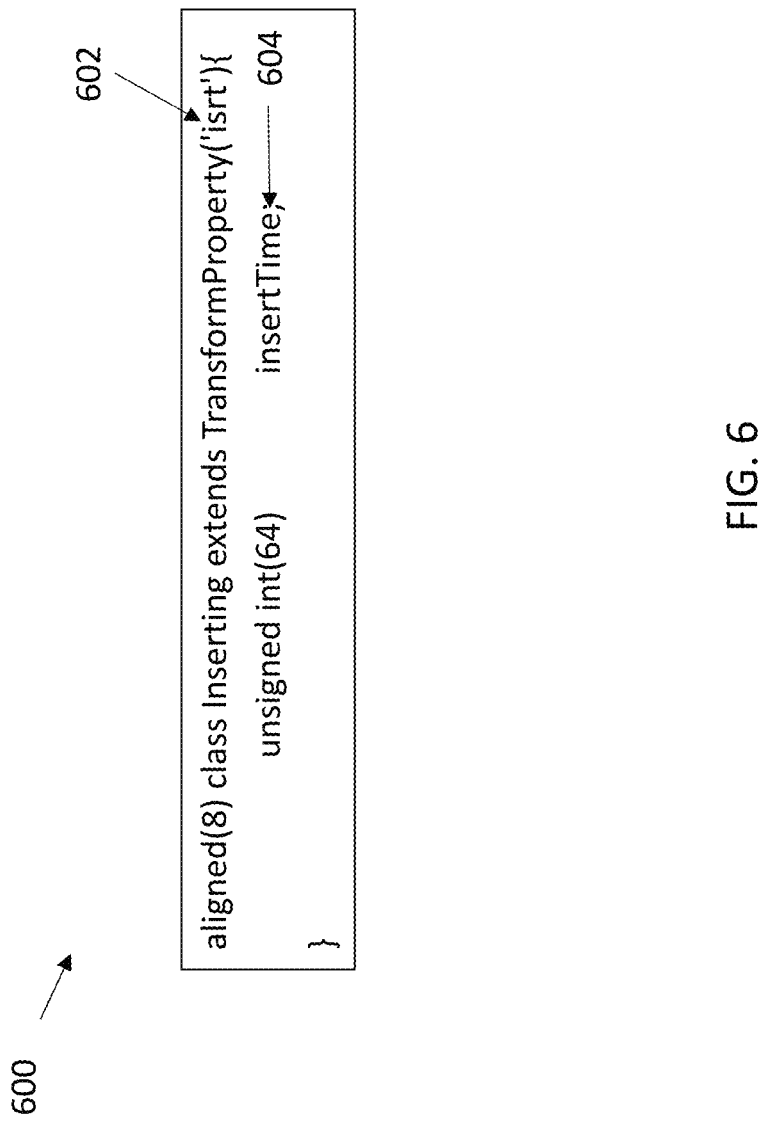
FIG. 6 shows an exemplary syntax for an insertion temporal track derivation, according to some embodiments.

Another example of a temporal track derivation is an insertion operation. An insertion operation can include splitting a first video into two sections, placing a second video (or a portion of a second video) in between the two sections of the first video, and joining the three sections together to insert the second video into the first video. FIG. 6 shows an exemplary syntax 600 for an insertion temporal track derivation, according to some embodiments. The insertion track derivation can be an optional derivation that can be specified in any quantity per sample. As shown in the exemplary syntax 600, the insert 'isrt' transform property 602 can provide information for the process of inserting an input track into another input track to derive an inserted track. The insert 'isrt' transform property can be used for two input tracks (e.g., num_inputs is equal to 2), where the two input tracks have a same timescale. Generally, the transform property can specify a media time where the insertion of the second input track happens to the first input track. The insertTime field 604 can specify a media time (in the scale of the timescale) of the first input track, at which the second input track is inserted.

Figure 7:
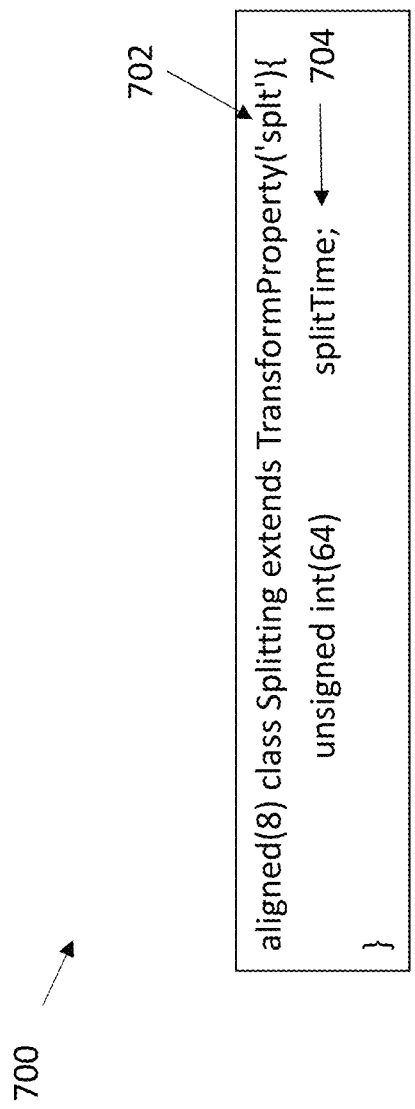
FIG. 7 shows an exemplary syntax for a split track derivation, according to some embodiments.

A further example of a temporal track derivation is a split operation. A split operation can be used, for example, to split a video into sections. For example, a long video can be cut into sections, such as to work with the sections separately. FIG. 7 shows an exemplary syntax 700 for a split track derivation, according to some embodiments. The split track derivation can be an optional derivation that can be specified in any quantity per sample. As shown in the syntax 700, the split 'splt' transform property 702 can provide information for the process of splitting an input track to derive two split tracks. The split 'splt' transform property can be used for one input track (e.g., num_inputs is equal to 1) to output two tracks (e.g., num_outputs is equal to 2). For example, m44800, "Media Processing related Track Derivations in ISOBMFF". October 2018. Macau, CN, which is hereby incorporated by reference in its entirety, describes expanding single output track derivations to multiple track derivations and track group derivations. Generally, the transform property can specify a media_time in the input track at which the split happens. The splitTime field 704 can specify a media_time (e.g., in the scale of the timescale) of the input track, at which split occurs where the first derived track contains all samples before the time, exclusively, and the second derived track contains all samples after the time, inclusively. While only one split time is shown in this example, a split transform property can be generalized to have "n" number of split times in the input track, which derives n+1 split tracks as the output.

In some embodiments, when performing a temporal track derivation, the media samples (e.g., media chunks, fragments, segments, sections, etc.) can be assigned different timestamps in derived tracks (e.g., such that a sample in the original input track has a different timestamp in the derived track). For example, for a trim operation that removes multimedia data from the head, where trimTime=n, the sample with timestamp n+m (m>=0) in the input track will be in the derived track with timestamp m. As another example, for a split operation, all samples with timestamps n, where n <splitTime, in the input track will become samples with the timestamps in the first output derived track, and all samples with timestamps m, m>=splitTime, in the input track will become samples with timestamps m-splitTime in the second output derived track.

Other forms of video editing can be specified as temporal track derivations that do not change the content itself, but change other aspects of the content, such as the speed and/or presentation aspects. An example of such a temporal track derivation is a slow-motion operation. A slow-motion operation can be used to provide an effect in media playback whereby time appears to be slowed down. The slow-motion operation can be achieved, for example, by making the playback speed of the temporal derived track slower than the playback speed of an input track.

Another example of a temporal track derivation is a fast-motion operation. A fast-motion operation can be used to provide an effect in media playback whereby time appears to be sped up. The fast-motion operation can be achieved, for example, by making the playback speed of the temporal derived track faster than the playback speed of an input track.

A further example of a temporal track derivation is a timescale operation. For example, a timescale increase or decrease operation can be used to increase or decrease the timescale of a multimedia clip. A timescale operation can be used to align the timescale of a multimedia clip with timescales of other tracks. For example, a timescale operation can be used in conjunction with a splice operation, as described herein.

The temporal track derivations can be specified using a transform property in a derived track. As described herein, a derived track can include a set of transform properties. Therefore, the temporal techniques described herein can be used in conjunction with spatial transforms. For example, a derived track can specify a temporal transform property and a spatial transform property (in that order), and a temporal transform can be performed first, and then a spatial transform. As another example, different levels of the track hierarchy can perform different types of track derivations. For example, a first derived track can be generated using temporal and/or spatial transforms, and that can be used as an input track to derive another track using temporal and/or spatial transforms.

Figure 8:
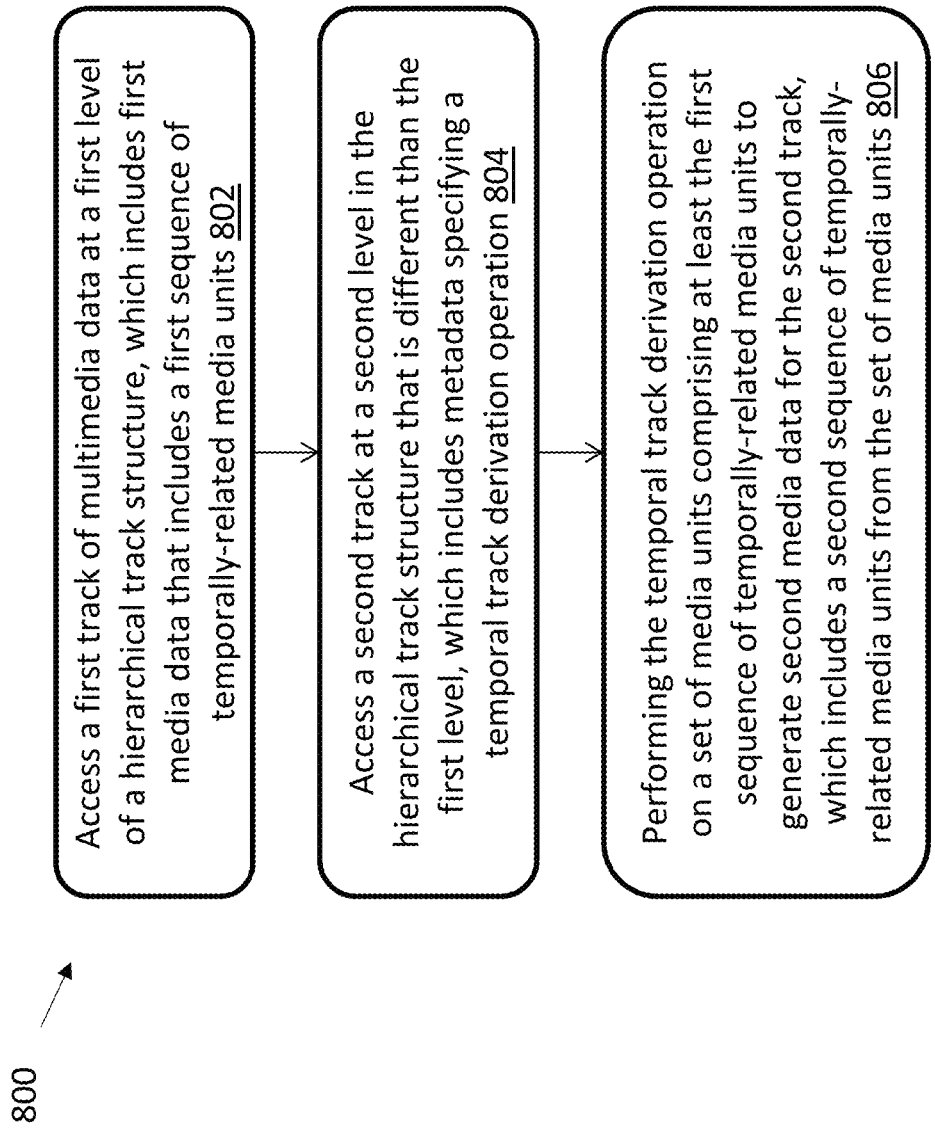
FIG. 8 shows an exemplary computerized method for performing a temporal track derivation, according to some embodiments.

FIG. 8 shows an exemplary computerized method 800 for performing a temporal track derivation, according to some embodiments. At steps 802 and 804, the computing device (e.g., the encoding device 104 or the decoding device 110) receives multimedia data that has a hierarchical track structure. In particular, at step 802, the computing device receives a first track at a first level of the hierarchical track structure that includes first media data, which can be, for example, one or more input tracks. The media data of each input track comprises a temporally-related sequence of media units, such that each media unit is associated with a different time than other media units in the temporally-related sequence. At step 804, the computing device receives a second track at a second level in the hierarchical track structure that is different than the first level of the first track. The second track includes metadata specifying a temporal track derivation operation (e.g., trim, cut, slow-motion, etc.). While steps 802 and 804 are shown as separate steps, it should be appreciated that the input track(s) and the track specifying the temporal track derivation operation can be received in one or a plurality of steps.

At step 806, the computing device performs the temporal track derivation operation on a set of media units that includes at least the first sequence of temporally-related media units to generate second media data for the second track. The second media data includes a second sequence of temporally-related media units from the set of media units. By virtue of performing the temporal operation, the second media data has a temporal modification (e.g., compared to the first media data), and therefore the second media data is different than the first media data. As described herein, such a temporal modification can include adding and/or removing multimedia content and/or changing other temporal aspects of the multimedia data, such as modifying the speed and/or timescale of the multimedia content.

In some embodiments as described herein, the metadata can specify an operation to add media data to an input track. Generally, to add media data, the computing device accesses a second input track (e.g., a third track) that includes new media data with a new temporally-related sequence of media units, and the temporal track derivation operation includes combining the first media data and the new media data to generate the second media data. For example, if the metadata specifies a splicing operation, the computing device performs the temporal track derivation operation by joining the first media data and the third media data. As another example, if the metadata specifies an insertion operation that includes an insertion time, the computing device performs the temporal track derivation operation by splitting the first media data at the insertion time into a first portion and a second portion, and joining the first portion, the third media data, and the second portion, so that the third media data is between the first portion and the second portion.

In some embodiments as described herein, the metadata can specify an operation to remove media data. The computing device can perform the temporal track derivation operation by removing a portion of the first media data to generate the second media data. For example, the metadata can specify a trim operation that includes a trim time specifying an amount of media data, and the computing device can perform the temporal track derivation operation by removing the amount of media data from a beginning portion or an end portion of the first media data. As another example, the metadata can specify a cut operation that includes a first and second cut time, and the computing device can perform the temporal track derivation operation by removing a middle portion of the first media data between the first and second cut times.

In some embodiments as described herein, the temporal track derivation can generate a plurality of derived tracks. For example, the computing device can generate, in addition to the second media data for the second track, third media data for a third track (and optionally further media data for further tracks). For a split operation that includes a split time, for example, the computing device can split the first media data at the split time into a first portion and a second portion, such that the second media data includes the first portion and the third media data includes the second portion.

In some embodiments as described herein, the temporal track derivation operation can perform modifications to the timing of an input track. For example, the metadata can specify a time change operation, such as changing the speed and/or timescale of the media data, and the computing device can perform the temporal track derivation operation to change a time aspect of the first media data (e.g., speeding up the first media data, slowing down the first media data, changing the time scale of the first media data, and/or the like).

As described herein, a derived track can be temporal if it consists of temporal sequences of contiguous samples (e.g., chucks, fragments, segments or sections) from one or more input tracks. Temporal track derivation techniques can be used alone and/or in combination with other track derivations, such as track derivations related to image manipulation (e.g., rotation, dissolve and ROI selection) and/or spatial composition (e.g., overlay composition, track grid composition and sub-picture track composition) of input tracks.

ISOBMFF, which is described in ISO/IEC 14496-12:2015 "Information technology—Coding of audio-visual objects—Part 12: ISO Base Media File Format," which is hereby incorporated by reference herein in its entirety, includes an edit list mechanism. The edit list mechanism provides for the movement (and possible re-use) of portions of the time-line of a track in the overall movie. The edit list mechanism also provides for the insertion of 'blank' time, known as empty edits. If a track does not start at the beginning of a presentation, an initial empty edit can be used.

The ISOBMFF edit list mechanism includes an Edit Box and an Edit List Box. The Edit Box is of the box type 'edts,' the container is Track Box ('trak'), it is not mandatory, and zero or one can be included in a track. An exemplary syntax is: aligned(8) class EditBox extends Box('edts') { }. The Edit Box can be used to map the presentation time-line to the media time-line as it is stored in the file. The Edit Box is a container for the Edit Lists, discussed further herein. Since the Edit Box is not mandatory, in the absence of the Edit Box there is an implicit one-to-one mapping of these time-lines, and the presentation of a track starts at the beginning of the presentation. An empty edit can be used to offset the start time of a track.

The Edit List Box is of the box type 'elst,' the container is Edit Box ('edts'), it is not mandatory, and zero or one can be included in the track. The Edit List Box can include an explicit timeline map. Each entry can be used to specify part of the track time-line by (a) mapping part of the media time-line, (b) indicating empty time, and/or (c) defining a dwell, where a single time-point in the media is held for a period. The edits that can be specified by an Edit List Box are not restricted to fall on sample times. Therefore, entering an edit may require backing up to a sync point, and pre-rolling from the sync point, and/or performing operations based on the duration of the first sample, which may have been truncated if the edit enters it during its normal duration. For audio, that frame may need to be decoded prior to the final slicing. Likewise, the duration of the last sample in an edit might need slicing.

FIG. 9 shows an exemplary syntax 900 for an edit list box, according to some examples. The version 902 is an integer that specifies the version of the edit list box (e.g., 0 or 1). The entry_count 904 is an integer that gives the number of entries in the edit list box. The segment duration 906A or 906B, collectively referred to as the segment duration 906, is an integer that specifies the duration of the particular edit segment in units of the timescale in the movie header box. The media_time 908A or 908B, collectively referred to as the media_time 908, is an integer containing the starting time within the media of this edit segment (in media time scale units, in composition time). If the media_time 908 is set to −1, it is an empty edit. The last edit in a track can be constrained to not be an empty edit. Any difference between the time duration in the Movie Header Box, and the track's duration can be expressed as an implicit empty edit at the end. The media_rate 910 specifies the relative rate at which to play the media corresponding to this edit segment. If the media_rate 910 value is 0, then the edit is specifying a dwell, such that the media at media-time is presented for the segment-duration. Otherwise, the media_rate 910 field shall contain the value 1.

Starting offsets for tracks or streams can be represented by an initial empty edit. For example, to play a track for 30 seconds, but starting at 10 seconds into the presentation, the following edit list can be used:

Entry-count=2
Segment-duration=10 seconds
Media-Time=−1
Media-Rate=1
Segment-duration=30 seconds (e.g., could be the length of the whole track)
Media-Time=0 seconds
Media-Rate=1

In the above example, the first edit skips the first 10 seconds of the track, and the second edit plays 30 seconds with no delay. In this example, the media_rate is set to 1, which preserves the existing media rate for playback. The media rate can be increased (e.g., greater than one) to increase the playback speed.

A non-empty edit may insert a portion of the media timeline that is not present in the initial movie, and is present only in subsequent movie fragments. For example, in an empty initial movie of a fragmented movie file (e.g., when there are no media samples yet present), the segment_duration of this edit may be zero, where the edit provides the offset from media composition time to movie presentation time, for the movie and subsequent movie fragments. Such an edit can be used to establish a presentation time of 0 for the first presented sample, when composition offsets are used (e.g., to essentially move forward a certain amount of time in the track). For example, if the composition time of the first composed frame is 20, then an edit that maps the media time from 20 onwards to movie time 0 onwards (e.g., to essentially move forward 20 seconds), can be the following edit list:

Entry-count=1
Segment-duration=0
Media-Time=20
Media-Rate=1

The techniques described herein provide for temporal derivation of tracks using edit operations, such as by using edit box and edit list mechanisms to select a sequence of media samples from each of input media tracks and merge the selected sequences of samples, in the temporal domain, to form the media samples of the derived track. As described herein, the edit operations can include removing portions of a track, cutting up a track, joining tracks, and/or the like.

In some embodiments, the techniques provide for a transform property for temporally derived tracks using edit mechanisms, such as using Edit Boxes and Edit List Boxes. The transform property can specify a temporal track derivation operation that includes a set of one or more edit operations to perform on each input track. Each operation of can specify a unit duration of the sequence of temporally-related media units of the first track (e.g., a number of media units of the first track associated with the operation, such as a number of units to keep and/or cut) and a unit in the sequence (e.g., a starting unit for the operation). The temporal track derivation operation can be performed by applying the set of one or more operations to each input track to generate the media data for the derived track.

In some embodiments, a list (e.g., possibly a chunk, as described in ISOBMFF) of media samples chosen from the input track for consideration in the temporal track derivation are those from the presentation timeline of the track. In some embodiments, if the input track contains an edit list, the media samples can be chosen from the presentation timeline of the track after considering the possible mapping of the presentation time-line to the media time-line as it is stored in the file. Each input track can include one edit box. The derived track can specify an (e.g., external) edit box, possibly empty and containing no edit list, for each input media track. The final list of media samples chosen from the input track is the list of media samples first chosen from the input track itself, and then chosen from the list by applying the possible edit list contained within the edit box specified by the derived track to the list. The media samples for the derived track are the samples of the list concatenated from the lists of media samples of the input tracks, with the concatenation order being the same as the order of the input media tracks.

Figure 10:
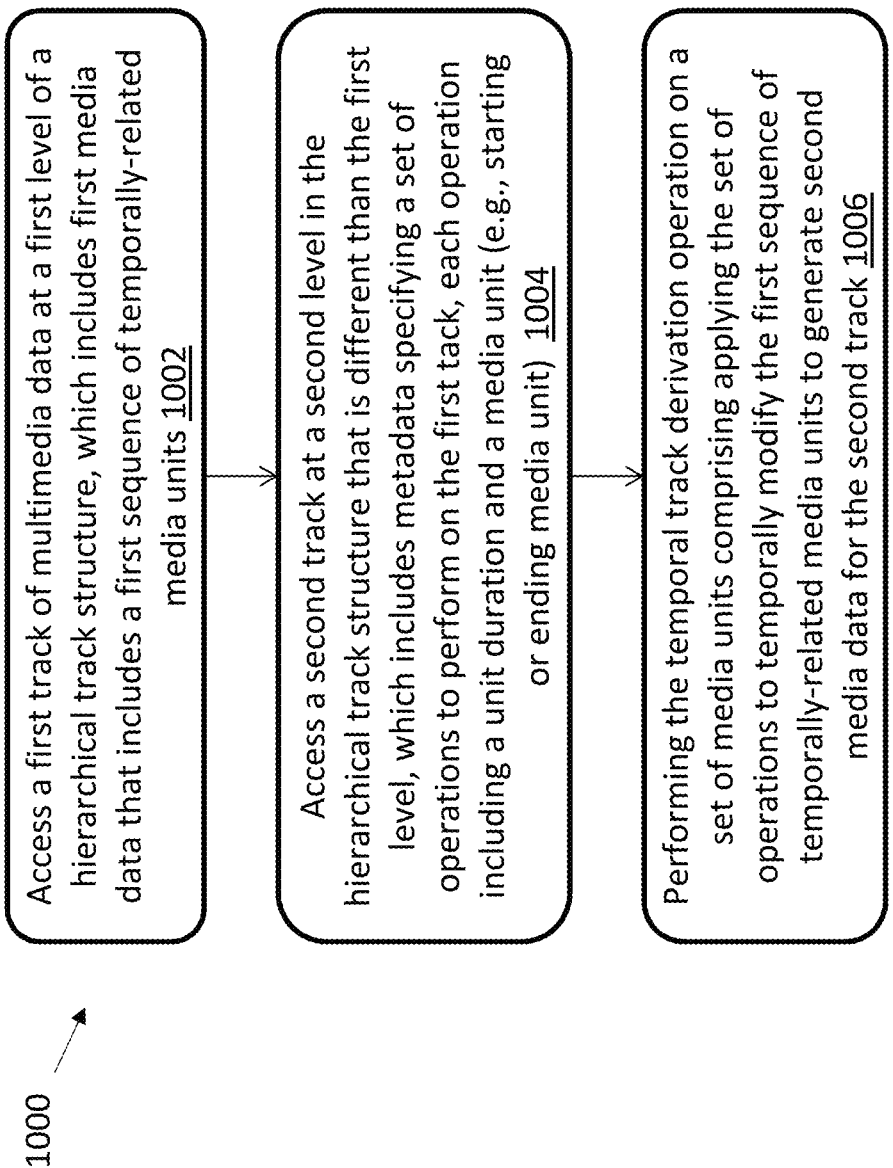
FIG. 10 shows an exemplary computerized method for performing a temporal track derivation using edit operations, according to some embodiments.

FIG. 10 shows an exemplary computerized method for performing a temporal track derivation using edit operations, according to some embodiments. At step 1002, the computing device accesses a first track of multimedia data at a first level of a hierarchical track structure. The first track includes first media data that includes a first sequence of temporally-related media units. At step 1004, the computing device accesses a second track at a second level in the hierarchical track structure that is different than the first level of the first track. For example, the second level may be above the first level, where the media data of the second track is derived based on the media data of the first track, as explained further herein. The second track includes metadata that specifies a temporal track derivation operation. The metadata includes a set of one or more operations to perform on the first track. Each operation includes a unit duration of the first sequence of temporally-related media units (e.g., a segment_duration field, as also discussed in conjunction with FIG. 9), and a media unit, such as a starting or ending media unit, in the first sequence of temporally-related media units (e.g., a media_time field, as discussed in conjunction with FIG. 9). At step 1006, the computing device performs the temporal track derivation operation on a set of media units that includes at least the first sequence of temporally-related media units of the first track. Performing the temporal track derivation operation includes applying the set of operations to temporally modify the first sequence of temporally-related media units to generate second media data for the second track, wherein the second media data comprises a second sequence of temporally-related media units from the set of media units.

As described herein, various techniques can be used to provide for a temporal transform property that uses edit operations to perform a temporal track derivation. FIG. 11 shows an exemplary syntax of an Edit Lists transform property 1100 for temporally derived tracks using Edit Boxes, according to some embodiments. In some embodiments, the Edit Lists transform property 1100 is of the box type 'edls,' is not mandatory per sample, and can be included in any quantity per sample. The Edit Lists transform property 1100, when present, includes a num inputs 1102 that is greater or equal to 1, and the input entities for the corresponding derivation operation are media tracks. The Edit Lists transform property 1100 specifies an Edit Box 1104 (e.g., as described in conjunction with FIG. 9) for each input track, and selects a list of media samples from the input track by applying the edit box to the samples of the track in its presentation timeline. The derived samples of the derived track result from splicing the selected lists of all the input tracks one after another in the same order of the input tracks. The syntax of the transform property 1100 is used for exemplary purposes only, as other syntaxes can be used without departing from the spirit of the techniques described herein.

For the purpose of illustrating temporal track derivations using edit operations, various examples are provided herein which should not be interpreted as limiting. The techniques can be used to carry out various types of video editing, including ad processing and ad insertion, and other types of video editing as desired.

In some examples, the track derivation operation can be used to trim media units, such as to remove the head and/or the tail of a video clip. The set of operations can therefore remove a set of one or more media units from the input track to generate some and/or all of the media content of the derived track. For example, a trim operation can specify a last media unit of a set of media units to remove from the input track, and a unit duration of zero (e.g., to indicate that all content should be included from the last media unit onwards in the input track). Applying such a trim operation removes the set of one or more media units from a beginning portion of the sequence of temporally-related media units of the input track. As another example, a trim operation can specify a unit duration that specifies the last media unit of a sequence of temporally-related media units of the input track (e.g., to keep), and a unit of zero (e.g., to indicate that units should be kept from the start of the input track through the last media unit). Applying such a trim operation removes the set of one or more media units from an end portion of the sequence of temporally-related media units of the input track.

As an example of a trim operation for a derived track that is a trim of an input track, the first n (where n>=0) units of media content in media_time can be removed from the input track using an edit list transform property. The edit list transform property can have one input track, and contain an Edit Box with an Edit List Box with a single entry as follows:
   num_inputs=1
   entry_count=1
   segment_duration=0
   media_time=n
   media_rate=1

As another example, the tail media content can be removed starting from the $n^{th}$ (n>=0) unit in media time using an edit list transform property. The edit list transform property can have one input track and contain an Edit Box with an Edit List Box with a single entry as follows:
   num_inputs=1
   entry_count=1
   segment_duration=n
   media_time=0
   media_rate=1

In some examples, the track derivation operation can be used to cut or remove a section of a video clip, such as by cutting the clip in two places and lifting out or removing the middle section and join the remaining two pieces. The set of operations can include a first operation that specifies a first portion of a cut operation (e.g., the first part of the clip to keep, occurring before the portion to remove) and a second operation that specifies a second portion of the cut operation (e.g., the second part of the clip to keep, occurring after the portion to remove). The first operation can specify a unit duration specifying a last media unit of the sequence of temporally-related media units before the cut operation, and a unit of zero (e.g., to indicate the unit duration begins at the start of the sequence of media units). The second operation can specify a starting media unit of the first sequence of temporally-related media units after the cut operation, and a unit duration of zero (e.g., to indicate that all content should be included from the starting media unit onwards in the input track). Applying the first and second operations removes the set of media units from a middle portion of the first sequence of temporally-related media units starting after the last media unit and ending before the starting media unit to remove the set of media units from the derived track.

As an example of a cut operation for a derived track that is a cut from an input track, a segment of n (n>=0) units of media content, starting at the $m^{th}$ (m>=0) unit, in media time, can be cut using an edit list transform property. The edit list transform property can have one input track and contain an Edit Box with an Edit List Box with two edits as follows:
   num_inputs=1
   entry_count=2
   segment_duration=m
   media_time=0
   media_rate=1
   segment_duration=0
   media_time=m+n
   media_rate=1

It should be appreciated that other edit box and edit list box configurations can be used besides the example above to achieve a cut transform property. As another example, a cut can be implemented as a derived track using two identical input tracks, with two Edit Boxes, each of which contains one edit from the previous example (e.g., rather than using a single input track with one Edit Box that contains the two edits).

In some examples, the track derivation operation can be used to split or cut a video, such as a long video, into one or more different sections. For example, a long video can be split into different sections to work with the sections separately. In some examples, for a track derivation operation that generates a single derived track, then the split operation can be implemented as multiple section cuts using different track derivation operations, with each derived track implemented as a cut of one section. For example, for a track derivation operation the set of operations can include a first operation that specifies a first portion of a cut operation (e.g., the first part of the clip to remove, occurring before the portion to keep) and a second operation that specifies a second portion of the cut operation (e.g., the second part of the clip to remove, occurring after the portion to keep). The first operation can specify a unit duration specifying a last media unit of the sequence of temporally-related media units before the cut operation and a unit of zero (e.g., to indicate the unit duration begins at the start of the sequence of media units). The second operation can specify a starting media unit of the first sequence of temporally-related media units after the cut operation, a unit duration of zero (e.g., to indicate that all content should be included from the starting media unit onwards in the input track). Applying the first and second operations removes the set of media units from the middle portion of the input track starting after the last media unit and ending before the starting media unit for the derived track.

In some examples, for a track derivation that can generate multiple derived tracks (e.g., a track group derivation), multiple split operations can be used to implement a track group derivation with multiple output derived tracks, each derived track being an associated section cut from a single input track. For example, a first derived track can include all of the media units of the sequence of temporally-related media units associated with a first cut operation (e.g., all of the media units before the first cut operation) and a second derived track can include all of the media units of the sequence of temporally-related media units associated with a second cut operation (e.g., all of the media units after a second cut operation).

In some examples, the track derivation operation can specify operations on multiple input tracks. For example, the track derivation operation can be used to splice or join two video clips together that are each different input tracks. For example, if a derived track is a splice of two input tracks, then an edit list transform property can use two input tracks and contain two empty Edit Boxes (e.g., since the content of each input track may not be changed for a splice operation). This is because the splicing is implemented by the derived track for multiple input tracks. In some embodiments, splice involves more than one track, and cannot be implemented with a single EditBox( ), as any edit list within it is only about edits of a same media track that it is associated with.

As another example of track derivation operations on multiple input tracks, track derivation operations can be used to insert a portion of one track into another track. For example, a first main video can be split into two sections, and a second supplemental video can be placed in between the two split sections and all three sections can be joined to insert the second video into the first video. For example, three input tracks can be used as part of an insertion operation, where two of the input tracks are the same main track and are used to derive the first and second split sections, and the remaining supplemental track includes the content for insertion.

In some examples, a first operation can specify a first cut operation to cut the beginning section from the main track. The first operation can specify a unit duration that specifies a media unit representative of an end of a beginning set of the main track, and a first unit of zero (e.g., to indicate that the cut operation starts at the beginning of the track). A second operation can specify a second cut operation to cut the part of the second supplemental track for the insertion. The second operation can specify a unit duration specifying a media unit representative of an end of a set of media units of the second track to inert, and a second unit of zero (e.g., to indicate that the cut operation starts at the beginning of the track). A third operation can specify a second cut operation to perform on the main track. The third operation can specify a unit specifying a media unit representative of a beginning of the end set of media units from the main track, and a third unit duration of zero (e.g., to indicate all content is played from the specified media unit). The system can perform the temporal track derivation operation by (1) applying the first cut operation to cut the beginning set of media units from the main track, (2) applying the second cut operation to cut the set of media units from the supplemental track (e.g., which could include simply keeping the entire supplemental track), (3) applying the third cut operation to cut the ending set of media units from the main track, and (4) joining the beginning set of media units from the main track, the set of media units from the supplemental track, and the ending set of media units from the third track.

An example of an insertion of a track "t" of "n" units of media content in media time, into another track "t'", starting at the $m^{th}$ unit of track t' in media time, then the transform property can operate on three input tracks, track t', track t, and track t', and contain three Edit Boxes, each with an Edit List Box with a single edit as follows for track t', track t, and track t', respectively:
 num_inputs=3
 entry_count=1
 segment_duration=m
 media_time=0
 media_rate=1
 entry_count=1
 segment duration=n
 media_time=0
 media_rate=1
 entry_count=1
 segment_duration=0
 media_time=m+n
 media_rate=1

In some embodiments, the edit list box for the supplemental track (the second edit list box in the example above) can be empty and contain no Edit List. An empty edit list box can be used for the supplemental track to, for example, insert the entire supplemental track into the main track.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method implemented by at least one processor in communication with a memory, wherein the memory stores computer-readable instructions that, when executed by the at least one processor, cause the at least one processor to perform:
   accessing multimedia data comprising a hierarchical track structure comprising at least:
      a first track at a first level of the hierarchical track structure comprising first media data, wherein the first media data comprises a first sequence of temporally-related media units; and
      a second track at a second level in the hierarchical track structure that is different than the first level of the first track, the second track comprising metadata specifying a temporal track derivation operation, wherein the metadata comprises a set of one or more operations to perform on the first track, each operation of the set of one or more operations comprising:
         a unit duration of the first sequence of temporally-related media units; and
         a start unit in the first sequence of temporally-related media units; and
   performing the temporal track derivation operation on a first set of media units comprising at least the first sequence of temporally-related media units, comprising:
      applying the set of one or more operations to temporally modify the first set of media units to generate a second set of media units, comprising (a) removing a third set of one or more media units of the first sequence of temporally-related media units, (b) adding a fourth set of one or more media units from a third sequence of temporally-related media units of a third track in the hierarchical track structure that are part of the first set of media units, or both, to generate a second sequence of temporally-related media units, wherein:
         the second set of media units comprises the second sequence of temporally-related media units; and
         the first set of media units is different than the second set of media units.

2. The method of claim 1, wherein:
   the set of one or more operations removes the third set of one or more media units of the first sequence of temporally-related media units; and
   said performing the temporal track derivation operation on the first set of media units comprises applying the set of one or more operations to remove the third set of one or more media units from the first sequence of temporally-related media units to generate the second sequence of temporally-related media units.

3. The method of claim 2, wherein:
   the set of one or more operations comprise a first operation specifying a trim operation comprising:
      a first unit duration of zero; and
      a first unit specifying a last media unit of the first set of media units of the first sequence of temporally-related media units; and
   said removing the third set of one or more media units from the first sequence of temporally-related media units comprises applying the first operation to remove the third set of one or more media units from a beginning portion of the first sequence of temporally-related media units through the last media unit.

4. The method of claim 2, wherein:
   the set of one or more operations comprise a first operation specifying a trim operation comprising:
      a first unit duration specifying a last media unit of the first sequence of temporally-related media units; and
      a first unit of zero; and
   said removing the third set of one or more media units from the first sequence of temporally-related media units comprises applying the first operation to remove the third set of one or more media units from an end portion of the first sequence of temporally-related media units starting from the last media unit.

5. The method of claim 2, wherein:
   the set of one or more operations comprise:
      a first operation specifying a first portion of a cut operation, comprising:
         a first unit duration specifying a last media unit of the first sequence of temporally-related media units before the cut operation; and
         a first unit of zero; and
      a second operation specifying a second portion of the cut operation, comprising:
         a second unit duration of zero; and
         a second unit specifying a starting media unit of the first sequence of temporally-related media units after the cut operation, which is determined based on the last media unit plus the third set of one or more media units; and said removing the third set of one or more media units from the first sequence of temporally-related media units comprises applying the first and second operations to remove the third set of one or more media units from a middle portion of the first sequence of temporally-related media units starting after the last media unit and ending before the starting media unit.

6. The method of claim 1, wherein:
the set of one or more operations comprise:
a first operation specifying a first portion of a cut operation, comprising:
a first unit duration specifying a last media unit of the first sequence of temporally-related media units before the cut operation; and
a first unit of zero; and
a second operation specifying a second portion of the cut operation, comprising:
a second unit duration of zero; and
a second unit specifying a starting media unit of the first sequence of temporally-related media units after the cut operation, which is determined based on the last media unit plus the third set of one or more media units;
said performing the temporal track derivation operation on the first set of media units comprises applying the first and second operations to generate the second sequence of temporally-related media units.

7. The method of claim 6, wherein said performing the temporal track derivation operation on the first set of media units comprises generating third media data for a fourth track at the second level in the hierarchical track structure that is different than the first level of the first track, the third media data comprising a fourth sequence of temporally-related media units, wherein the second sequence of temporally-related media units comprises a first set of all media units of the first sequence of temporally-related media units before the cut operation and the fourth sequence of temporally-related media units comprises a second set of all media units after a second cut operation.

8. The method of claim 7, wherein:
the set of one or more operations comprise:
a third operation specifying a first portion of the second cut operation, comprising:
a third unit duration specifying a second last media unit of the first sequence of temporally-related media units before the cut operation; and
a third unit of zero; and
a fourth operation specifying a second portion of the second cut operation, comprising:
a fourth unit duration of zero; and
a fourth unit specifying a second starting media unit of the first sequence of temporally-related media units after the second cut operation, which is determined based on the second last media unit plus a second set of one or more media units; and
generating the third media data for the fourth track comprises applying the third and fourth operations to generate the fourth sequence of temporally-related media units.

9. The method of claim 1, wherein:
the third track is at a third level below the second level;
the metadata comprises a second set of one or more operations to perform on the third track, each operation comprising:
a second unit duration of the third sequence of temporally-related media units; and
a second unit in the third sequence of temporally-related media units.

10. The method of claim 9, wherein:
the set of one or more operations and the second set of one or more operations comprise empty operation sets; and
performing the temporal track derivation operation on the first set of media units comprises joining the first sequence of temporally-related media units and the third sequence of temporally-related media units to generate the second sequence of temporally-related media units.

11. The method of claim 9, wherein:
the set of one or more operations comprise a first operation specifying a first cut operation comprising:
a first unit duration specifying a first media unit representative of an end of a first set of the first sequence of temporally-related media units; and
a first unit of zero;
the second set of one or more operations comprising a second operation specifying a second cut operation comprising:
a second unit duration specifying a second media unit representative of an end of a second set of the third sequence of temporally-related media units; and
a second unit of zero; and
the metadata further comprises a third set of one or more operations to perform on the first track, the third set of one or more operations comprising a third operation specifying a third cut operation comprising:
a third unit duration of zero; and
a third unit specifying a third media unit representative of a beginning of a third set of the first sequence of temporally-related media units; and
said performing the temporal track derivation operation on the first set of media units comprises:
applying the first operation to cut the first set of the first sequence of temporally-related media units from the first sequence of temporally-related media units;
applying the second operation to cut the second set of the third sequence of temporally-related media units from the third sequence of temporally-related media units;
applying the third operation to cut the third set of the first sequence of temporally-related media units from the first sequence of temporally-related media units; and
joining the first set, the second set, and the third set, so that the second set is between the first set and the second set.

12. An apparatus comprising a processor in communication with memory, the processor being configured to execute instructions stored in the memory that cause the processor to perform:
accessing multimedia data comprising a hierarchical track structure comprising at least:
a first track at a first level of the hierarchical track structure comprising first media data, wherein the first media data comprises a first sequence of temporally-related media units; and
a second track at a second level in the hierarchical track structure that is different than the first level of the first track, the second track comprising metadata specifying a temporal track derivation operation, wherein the metadata comprises a set of one or more operations to perform on the first track, each operation of the set of one or more operations comprising:

a unit duration of the first sequence of temporally-related media units; and
a start unit in the first sequence of temporally-related media units; and
performing the temporal track derivation operation on a first set of media units comprising at least the first sequence of temporally-related media units, comprising:
applying the set of one or more operations to temporally modify the first set of media units to generate a second set of media units, comprising (a) removing a third set of one or more media units of the first sequence of temporally-related media units, (b) adding a fourth set of one or more media units from a third sequence of temporally-related media units of a third track in the hierarchical track structure that are part of the first set of media units, or both, to generate a second sequence of temporally-related media units, wherein:
the second set of media units comprises the second sequence of temporally-related media units; and
the first set of media units is different than the second set of media units.

13. The apparatus of claim 12, wherein:
the set of one or more operations removes the third set of one or more media units of the first sequence of temporally-related media units; and
said performing the temporal track derivation operation on the first set of media units comprises applying the set of one or more operations to remove the third set of one or more media units from the first sequence of temporally-related media units to generate the second sequence of temporally-related media units.

14. The apparatus of claim 13, wherein:
the set of one or more operations comprise a first operation specifying a trim operation comprising:
a first unit duration of zero; and
a first unit specifying a last media unit of the first set of media units of the first sequence of temporally-related media units; and
said removing the third set of one or more media units from the first sequence of temporally-related media units comprises applying the first operation to remove the third set of one or more media units from a beginning portion of the first sequence of temporally-related media units through the last media unit.

15. The apparatus of claim 13, wherein:
the set of one or more operations comprise a first operation specifying a trim operation comprising:
a first unit duration specifying a last media unit of the first sequence of temporally-related media units; and
a first unit of zero; and
said removing the third set of one or more media units from the first sequence of temporally-related media units comprises applying the first operation to remove the third set of one or more media units from an end portion of the first sequence of temporally-related media units starting from the last media unit.

16. The apparatus of claim 13, wherein:
the set of one or more operations comprise:
a first operation specifying a first portion of a cut operation, comprising:
a first unit duration specifying a last media unit of the first sequence of temporally-related media units before the cut operation; and
a first unit of zero; and a second operation specifying a second portion of the cut operation, comprising:
a second unit duration of zero; and
a second unit specifying a starting media unit of the first sequence of temporally-related media units after the cut operation, which is determined based on the last media unit plus the third set of one or more media units; and
said removing the third set of one or more media units from the first sequence of temporally-related media units comprises applying the first and second operations to remove the third set of one or more media units from a middle portion of the first sequence of temporally-related media units starting after the last media unit and ending before the starting media unit.

17. The apparatus of claim 12, wherein:
the set of one or more operations comprise:
a first operation specifying a first portion of a cut operation, comprising:
a first unit duration specifying a last media unit of the first sequence of temporally-related media units before the cut operation; and
a first unit of zero; and
a second operation specifying a second portion of the cut operation, comprising:
a second unit duration of zero; and
a second unit specifying a starting media unit of the first sequence of temporally-related media units after the cut operation, which is determined based on the last media unit plus the third set of one or more media units;
said performing the temporal track derivation operation on the first set of media units comprises applying the first and second operations to generate the second sequence of temporally-related media units.

18. The apparatus of claim 17, wherein said performing the temporal track derivation operation on the first set of media units comprises generating third media data for a fourth track at the second level in the hierarchical track structure that is different than the first level of the first track, the third media data comprising a fourth sequence of temporally-related media units, wherein the second sequence of temporally-related media units comprises a first set of all media units of the first sequence of temporally-related media units before the cut operation and the fourth sequence of temporally-related media units comprises a second set of all media units after a second cut operation.

19. The apparatus of claim 18, wherein:
the set of one or more operations comprise:
a third operation specifying a first portion of the second cut operation, comprising:
a third unit duration specifying a second last media unit of the first sequence of temporally-related media units before the cut operation; and
a third unit of zero; and
a fourth operation specifying a second portion of the second cut operation, comprising:
a fourth unit duration of zero; and
a fourth unit specifying a second starting media unit of the first sequence of temporally-related media units after the second cut operation, which is determined based on the second last media unit plus a second set of one or more media units; and
generating the third media data for the fourth track comprises applying the third and fourth operations to generate the fourth sequence of temporally-related media units.

20. The apparatus of claim 12, wherein:
the third track is at a third level below the second level;
the metadata comprises a second set of one or more operations to perform on the third track, each operation comprising:
  a second unit duration of the third sequence of temporally-related media units; and
  a second unit in the third sequence of temporally-related media units.

21. At least one non-transitory computer readable storage medium storing processor-executable instructions that, when executed by at least one processor, cause the at least one processor to perform:
accessing multimedia data comprising a hierarchical track structure comprising at least:
  a first track at a first level of the hierarchical track structure comprising first media data, wherein the first media data comprises a first sequence of temporally-related media units; and
  a second track at a second level in the hierarchical track structure that is different than the first level of the first track, the second track comprising metadata specifying a temporal track derivation operation, wherein the metadata comprises a set of one or more operations to perform on the first track, each operation of the set of one or more operations comprising:
    a unit duration of the first sequence of temporally-related media units; and
    a start unit in the first sequence of temporally-related media units; and
performing the temporal track derivation operation on a first set of media units comprising at least the first sequence of temporally-related media units, comprising:
  applying the set of one or more operations to temporally modify the first set of media units to generate a second set of media units, comprising (a) removing a third set of one or more media units of the first sequence of temporally-related media units, (b) adding a fourth set of one or more media units from a third sequence of temporally-related media units of a third track in the hierarchical track structure that are part of the first set of media units, or both, to generate a second sequence of temporally-related media units, wherein:
    the second set of media units comprises the second sequence of temporally-related media units; and
  the first set of media units is different than the second set of media units.

\* \* \* \* \*